(12) United States Patent
Goforth et al.

(10) Patent No.: US 10,990,999 B1
(45) Date of Patent: Apr. 27, 2021

(54) SYSTEM INCLUDING COMMUNICATION INTERFACE BASED SENDING OF DIGITAL PROMOTIONS AND RELATED METHODS

(71) Applicant: INMAR CLEARING, INC., Winston-Salem, NC (US)

(72) Inventors: Steven Goforth, Lakeland, FL (US); Richard Polhemus, Winston-Salem, NC (US); Chris Granger, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 811 days.

(21) Appl. No.: 15/159,390

(22) Filed: May 19, 2016

(51) Int. Cl.
*G06Q 30/02* (2012.01)

(52) U.S. Cl.
CPC .................. *G06Q 30/0239* (2013.01)

(58) Field of Classification Search
CPC .................................................. G06Q 30/0239
See application file for complete search history.

(56) References Cited

U.S. PATENT DOCUMENTS

| | | | |
|---|---|---|---|
| 2004/0140361 A1* | 7/2004 | Paul | G06Q 20/36 235/462.45 |
| 2013/0117094 A1* | 5/2013 | Jones | G06Q 30/0222 705/14.35 |
| 2015/0032572 A1* | 1/2015 | Spano | G06Q 30/0623 705/26.61 |

OTHER PUBLICATIONS

Venkatesan R, Farris PW. Measuring and Managing Returns from Retailer-Customized Coupon Campaigns. Journal of Marketing. 2012;76(1):76-94. doi:10.1509/jm.10.0162 (Year: 2012).*

* cited by examiner

*Primary Examiner* — Hajime Rojas
*Assistant Examiner* — Christopher C Busch
(74) *Attorney, Agent, or Firm* — Allen, Dyer, Doppelt + Gilchrist, P.A. Attorneys at Law

(57) ABSTRACT

A system may include a memory that includes a database of retailer-supplied promotions associated with a first plurality of brand items, and a database of promotions associated with a second plurality of brand items. The system also includes a communications interface configured to communicate with a remote device and a processor coupled to the memory and the communication interface. The processor is configured to determine whether a given promotion matches any retailer-supplied promotion, and when the given promotion matches, then not send a corresponding digital promotion via the communications interface to the remote device. The processor is also configured to, when the given promotion does not match, then send the corresponding digital promotion via the communications interface to the remote device for redemption.

15 Claims, 5 Drawing Sheets

SYSTEM INCLUDING COMMUNICATION INTERFACE BASED SENDING OF DIGITAL PROMOTIONS AND RELATED METHODS

TECHNICAL FIELD

The present invention is related to the field of electronics, and more particularly, to a system for processing digital promotions, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

To increase savings, a consumer may seek to apply both a manufacturer-supplied coupon and a retailer-supplied coupon. This is often referred to as coupon stacking. U.S. Patent Application No. 2013/0117094 to Jones et al. discloses an automated system for optimizing retail savings using coupons. More particularly, Jones et al. discloses a system that maintains a store profile database storing attributes of retail stores, including location and coupon policy rules, a coupon profile database storing the attributes of current and future coupons, a sale profile database storing attributes of sale events at the stores, and a subscriber profile database storing identifiers of stores preferred by the subscriber, subscriber preferences, and the like. The system performs a matchup process executed by the system that interrogates the databases to identify matches among stores, coupons, and sale events, and provides the subscriber with a list of those matches, from which the subscriber can enter shopping list inputs that identify items that the subscriber wants to purchase, including coupons possessed by the subscriber. A process executed by the system uses the shopping list inputs to create suggested transactions for the subscriber that minimizes out-of-pocket cost, maximizes savings, or maximizes the value of items purchased within a spending limit. While coupon stacking may be particularly advantageous for a consumer, it may not be desirable from the perspective of the retailer and/or manufacturer.

SUMMARY

A system may include a memory that includes a database of retailer-supplied promotions associated with a first plurality of brand items, and a database of promotions associated with a second plurality of brand items. The system also includes a communications interface configured to communicate with a remote device and a processor coupled to the memory and the communication interface. The processor is configured to determine whether a given promotion matches any retailer-supplied promotion, and when the given promotion matches, then not send a corresponding digital promotion via the communications interface to the remote device. The processor is also configured to, when the given promotion does not match, then send the corresponding digital promotion via the communications interface to the remote device for redemption. Accordingly, the system may not send digital promotions corresponding to a same brand item as a retailer-supplied promotion, for example, so as to reduce occurrences of promotion or coupon stacking.

The database may include a database of retailer-supplied promotions, the given promotion may include a retailer-supplied promotion, and the corresponding digital promotion may include another retailer-supplied promotion. The database may include a database of manufacturer-supplied promotions, the given promotion may include a manufacturer-supplied promotion, and wherein the corresponding digital promotion may include a manufacturer-supplied digital promotion, for example.

The processor may be configured to determine whether the given promotion matches any retailer-supplied promotion based upon a match of brand names associated with the first and second plurality of brand items, for example. The first and second plurality of brand items each have first and second unique identifications (IDs) associated therewith, and the processor may be configured to determine whether the given promotion matches any retailer-supplied promotion based upon the first and second unique IDs.

The processor may be configured to, when the given promotion matches, then withhold from sending the corresponding retailer-supplied digital promotion via the communications interface to the remote device for redemption. The communication interface may include a wireless interface. The remote device may include a remote wireless communications device, and the processor may be configured to send the corresponding digital promotion to the remote wireless communications device via the wireless interface, for example.

The communication interface may include a website, and the remote device may include a display for displaying the corresponding digital promotion based upon the website. The system may include a further communications interface, and the processor may be configured to receive the promotions via the further communications interface.

The database of retailer-supplied promotions may include retailer-supplied digital promotions. The database of retailer-supplied promotions may include retailer-supplied paper promotions, for example. The processor may be configured to determine whether the given promotion matches any retailer-supplied promotion irrespective of a dollar amount associated with the retailer-supplied promotion and the given promotion.

A method aspect is directed to a method of processing a given manufacturer-supplied promotion. The method may include using a processor and an associated memory to determine whether a given promotion stored in a database within the memory of promotions associated with a first plurality of brand items matches any retailer-supplied promotion stored in a database of retailer-supplied promotions associated with a second plurality of brand items. The method may also include using the processor to, when the given promotion matches, then not send a corresponding digital promotion via a communications interface to a remote device, and when the given promotion does not match, then send the corresponding manufacturer-supplied digital promotion via the communications interface to the remote device for redemption.

A non-transitory computer-readable medium is directed to a non-transitory computer readable medium that includes computer-executable instructions that when executed by a processor cause the processor to perform operations. The operations may include determining whether a given promotion stored in a database of promotions associated with a first plurality of brand items matches any retailer-supplied promotion stored in a database of retailer-supplied promotions associated with a second plurality of brand items. The operations may also include, when the given promotion matches, then not sending a corresponding digital promotion via a communications interface to a remote device, and, when the given promotion does not match, then sending the corresponding digital promotion via the communications interface to the remote device for redemption.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
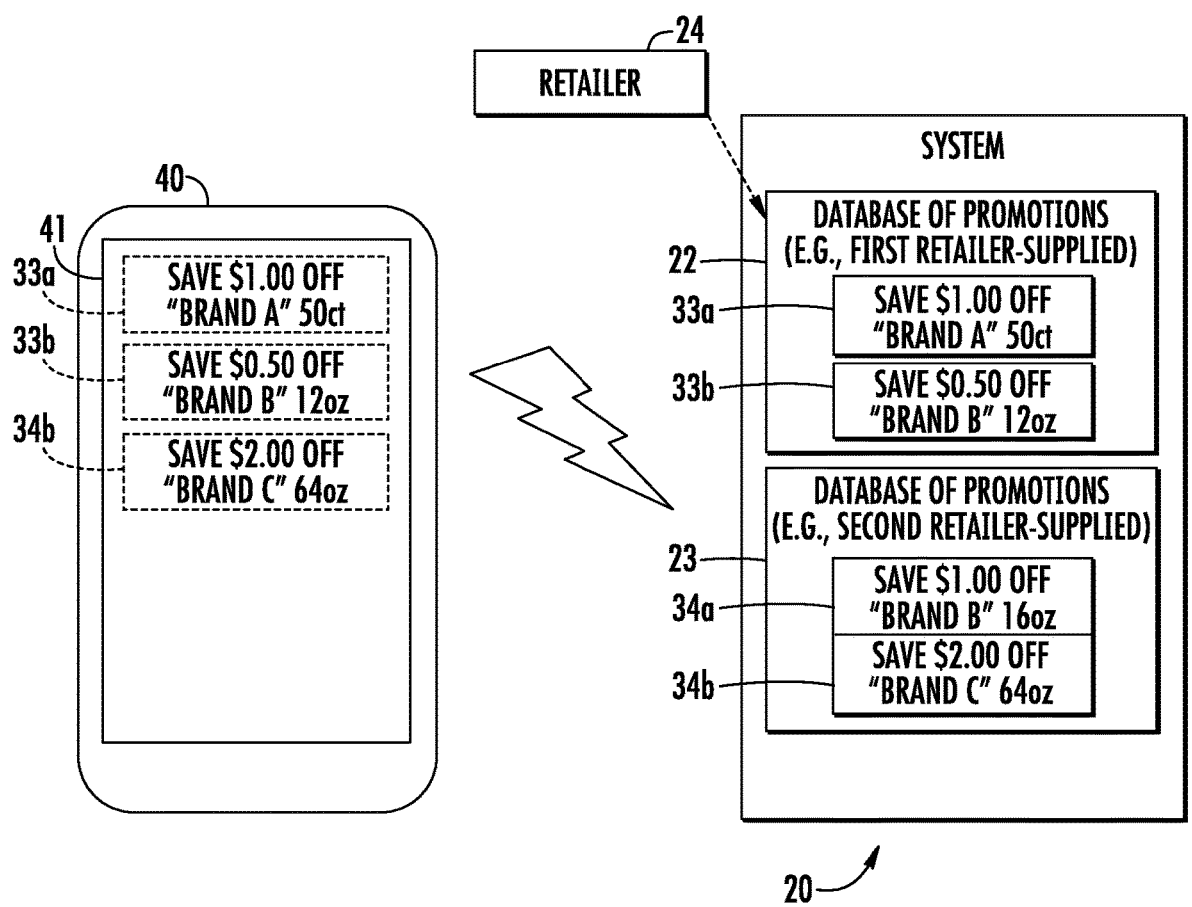
FIG. 1 is a schematic diagram of a system according to an embodiment.
Figure 2:
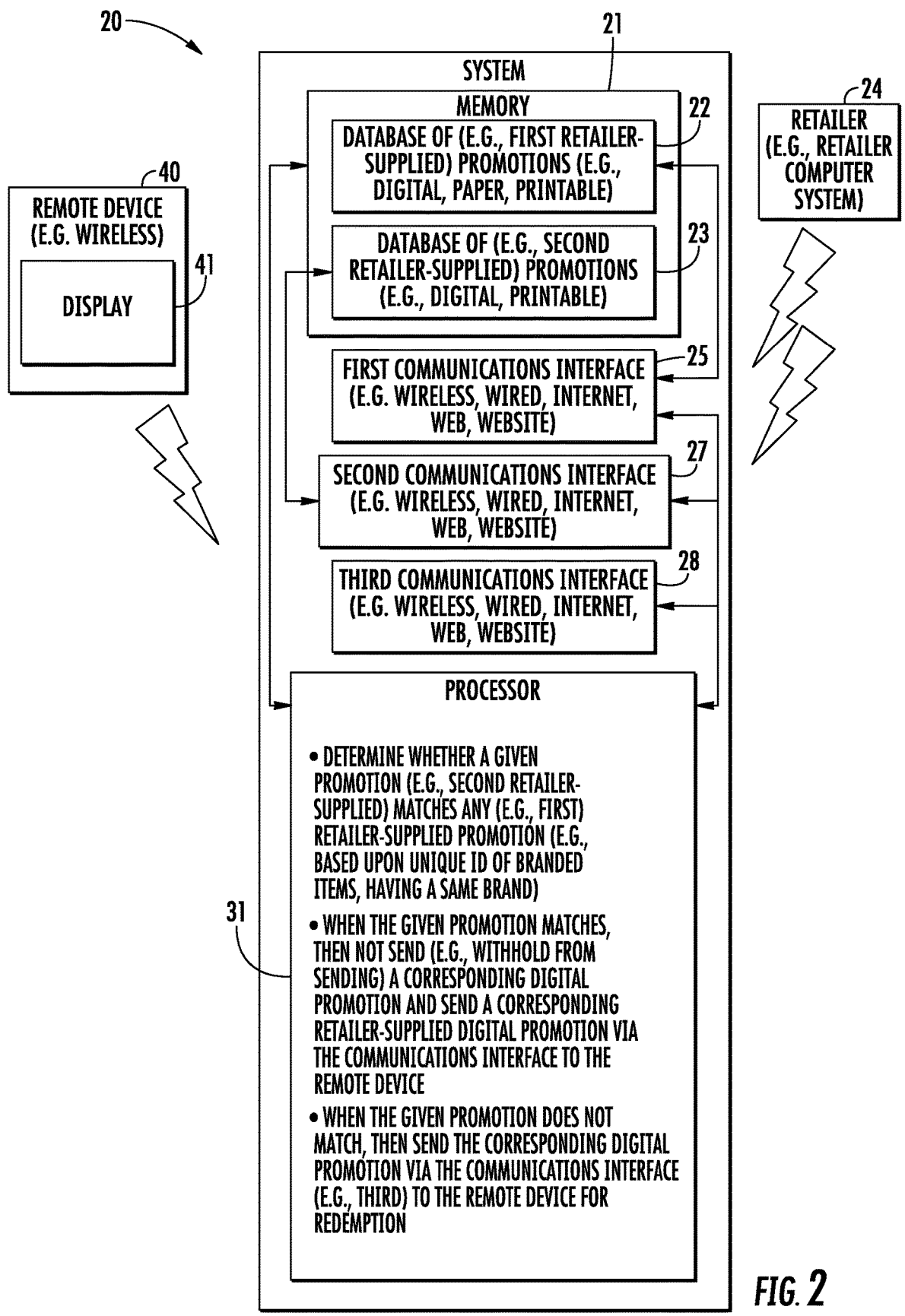
FIG. 2 is more detailed schematic block diagram of the system of FIG. 1.

Referring initially to FIGS. 1 and 2, a system 20, which may be in the form of a computer server, includes a memory 21. A database of first retailer-supplied promotions 22 associated with first brand items is stored in the memory 21. A given retailer 24 may communicate with the system 20 via a first communications interface 25, for example, an Internet or Web interface or portal, to add, delete, or modify the database of retailer-supplied promotions 22. More than one retailer may have retailer-supplied promotions stored in the database of first retailer-supplied promotions 22 and/or there may be more than one database of retailer-supplied promotions each corresponding to a given retailer.

The first communications interface 25 may be a mobile or wireless device interface, for example, or may also be a wired interface, and/or an Internet or Web interface or portal. In other words, the retailer, for example, via the retailer computer system that includes a processor coupled to a memory, display, and an input device, may communicate with the system 20 wirelessly or by wire via an application or program or by a web portal accessed by the retailer through a web browser, for example. The database of first retailer-supplied promotions 22 may include retailer-supplied promotions for multiple retailers, or alternatively, there may different databases of retailer-supplied promotions corresponding to each retailer.

In one example, in a given week, the given retailer 24, for example, via a retailer computer system, may update the database of first retailer-supplied promotions 22 to reflect items that the retailer has placed on sale via a coupon. Of course, the given retailer 24 may update the database of first retailer-supplied promotions 22 on any interval, but it will be appreciated by those skilled in the art that promotional cycles typically last a week. The given retailer 24 may update the database of retailer-supplied promotions based upon a geographical area, for example, the promotions may be regionally applicable.

The coupon or promotion may be available in paper or may be a digital promotion, as will be appreciated by those skilled in the art. The first retailer-supplied promotions may include promotions for one or more brands of items. For example, a first promotion 33a may be for $1.00 off a 50-capsule bottle of "Brand A" pain medication, while a second promotion 33b may be for $0.50 off a 12-ounce bottle of "Brand B" laundry detergent that are applicable or valid in a particular, state and/or region. As will be appreciated by those skilled in the art, each brand item for which there is a promotion has a unique ID associated therewith, for example, a UPC. Each corresponding promotion may also include a unique promotion ID for identifying the particular promotion, which may in some instances, include other information about the promotion, for example, expiration date, etc. Of course, the brand items and the corresponding promotions may have other and/or additional identifying information.

The memory 21 also includes a database of second promotions associated with corresponding brand items. The database of promotions may be a database of second retailer-supplied promotions 23, for example. More particularly, the given retailer 24 may update the database of second retailer-supplied promotions 23 with second retailer-supplied promotions for a particular local geographic area, that may be smaller than the regional geographical areas (e.g., a city).

The given retailer 24 may communicate with the system 20 to communicate the second retailer-supplied promotions via a second communications interface 27, for example, an Internet or Web interface or portal, to add, delete, or modify the database of retailer-supplied promotions 23. The second communications interface 27 may be a mobile or wireless device interface, for example, or may also be a wired interface, and/or an Internet or Web interface or portal. The database of second retailer-supplied promotions 23 may include retailer-supplied promotions for multiple retailers, or alternatively, there may different databases of retailer-supplied promotions corresponding to each retailer and/or the same retailer. Of course, in some embodiments, the given retailer 24 may communicate the first and second retailer-supplied promotions with the system 20 using one communications interface.

In one example, in a given promotional period, the given retailer 24 may update the database of second retailer-supplied promotions 23 to reflect items that have been placed on sale via a local coupon or promotion. The coupon or promotion may be available as a digital promotion, as will be appreciated by those skilled in the art.

The promotions in the database of second retailer-supplied promotions 23 may include promotions for one or more brands of items placed on sale by the given retailer 24 on a more local level or more geographically restricted area, for example. Of course, the items or promotions in the database of second retailer-supplied promotions 23 may have another relationship, for example, not limited to geography. For example, the given retailer 24 may place "Brand B" and "Brand C" products on sale (i.e., having a promotion associated therewith) in a particular region or state. Thus, the given retailer 24 may offer a first promotion 34a for $1.00 off a 16-ounce bottle of "Brand B" laundry detergent and a second promotion 34b for $2.00 off a 64-ounce bottle of "Brand C" dishwasher tablets in a particular city, for example. As will be appreciated by those skilled in the art, each brand item for which there is a promotion has a unique ID associated therewith, for example, a UPC. Each corresponding promotion may also include a unique promotion ID for identifying the particular promotion, which may in some instances, include other information about the promotion, for example, expiration date, etc. Of course, the brand items and the corresponding promotions may have other and/or additional identifying information.

It should be noted that while the system 20 is described as being remote from a retailer computer system or multiple retailer computer systems, in some embodiments, the system may be included as part of or co-located with any part of or all of one or more retailer computer systems.

The system 20 also includes a processor 31 coupled to the memory 21. The processor 31 cooperates with a remote device 40 that may be associated with a consumer, for example, and may communicate with the system 20 via a third communications interface 28. The third communications interface 28 may be mobile or wireless device interface, for example, when the remote device 40 is in the form of a mobile telephone or other mobile device. The third communications interface 28 may also be a wired interface, and/or an Internet or Web interface or portal. In other words, the consumer may communicate with the system wirelessly or by wire via an application stored on the remote device or by a web portal accessed by the consumer through a web browser, for example.

The processor 31 of the system 20 may cooperate with the remote device 40 to display on a display 41 thereof available digital promotions for the given retailer 24. The processor 31 and the remote device 40 may also cooperate to permit the user to select different brand items presented on the display for "clipping" to e-wallet, for example. In other words, the selected different brand items may be saved, associated with a retailer loyalty program, and/or retrieved at checkout at the retailer, for example at a point-of-sale (POS) terminal. In some embodiments, the selected different brand items for which there is a promotion may be printed for redemption (i.e., print-at-home).

Figure 3:
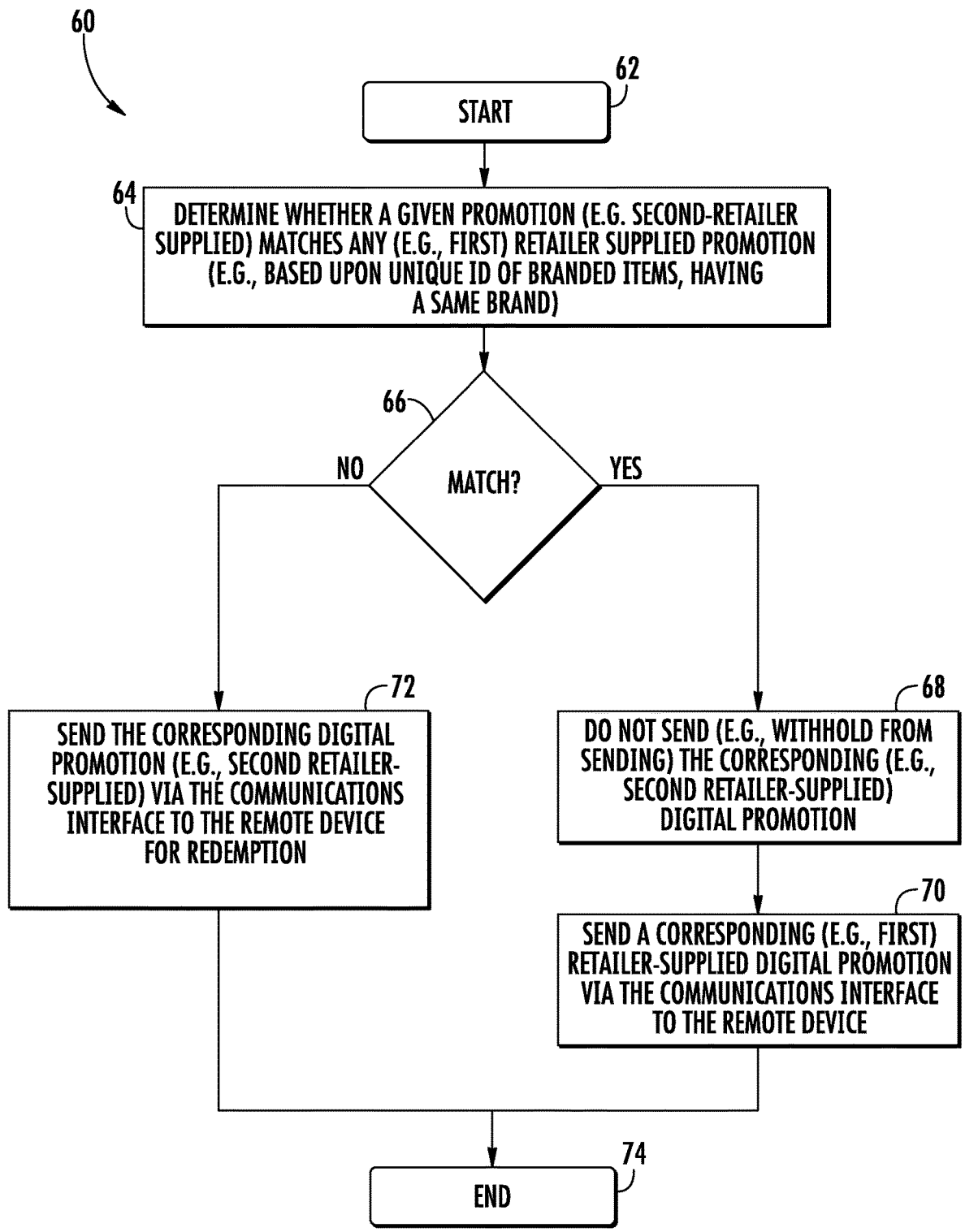
FIG. 3 is a flow chart illustrating operation of the system of FIG. 2.

Referring now additionally to the flowchart 60 in FIG. 3, further details of operation of the system will now be described. Beginning at Block 62, the processor 31 determines whether a given promotion, e.g., a second retailer-supplied promotion by the given retailer, matches any other retailer-supplied promotion (e.g., based upon geography) (Block 64). The processor 31 may determine a match by comparing the unique IDs of the each of the brand items for which there is a promotion. The unique ID may be indicative of or correspond to the brand of the brand item. The processor 31 determines a match when the brand item corresponding to the second retailer-supplied promotion is the same brand as a brand item corresponding to a first retailer-supplied promotion. With respect to the above-referenced brand examples, the processor 31 determines a match based upon the database of first retailer-supplied promotions 22 having a promotion 33b for $0.50 off a 12-ounce bottle of "Brand B" laundry detergent and the database of second retailer-supplied promotions 23 having a promotion 34a for $1.00 off a 16-ounce bottle of "Brand B" laundry detergent. Since a "Brand B" item is in both the database of first retailer-supplied promotions 22 and the database of second retailer-supplied promotions 23, a match is determined. In other words, the processor 31 may determine a match when brands of the brand items match irrespective of product packaging sizes, and irrespective of dollar amounts associated with either of the retailer-supplied promotions. Of course, other identifiers, codes, or database fields may be used as a basis to determine a match.

When the given promotion, i.e., the second retailer-supplied promotion, matches (Block 66), then the processor 31 does not send a corresponding retailer-supplied digital promotion 34a via the third communications interface 28 to the remote device 40 (Block 68). In other words, the processor 31 withholds the corresponding second retailer-supplied digital promotion 34a, which would otherwise have been, but for the match, sent to the remote device 40 for redemption. The user of the remote device 40 may not even be aware that such a promotion for the given brand item exists, for example. The processor 31, upon the match, may send a corresponding retailer-supplied digital promotion 33b (i.e. the first retailer-supplied digital promotion) to the remote device 40 (Block 70). In some embodiments, the corresponding retailer-supplied digital promotion may have been previously sent to the remote device 40. As will be appreciated by those skilled in the art, by not sending a corresponding second retailer-supplied digital promotion to the remote device 40 when there exists another (i.e., first) retailer-supplied promotion for the same brand item, the system 20 may advantageously reduce occurrences of coupon doubling.

When the second retailer-supplied promotion does not match a first retailer-supplied promotion (Block 66), meaning that a retailer does not have two current promotions for an item of the same brand, the processor 31 sends the corresponding second retailer-supplied digital promotion via the third communications interface 28 to the remote device 40 (Block 72). For example, when the third communications interface 28 includes an Internet and web interface or portal, the user at the remote device 40 may be visually presented with the retailer-supplied digital promotion, for example, on the display 41. The method ends at Block 74.

In some embodiments where a corresponding second retailer-supplied digital promotion had been previously communicated, for example, visually displayed on the display 41 of the remote device 40 but not "clipped," the processor 31 may begin withholding sending the corresponding second retailer-supplied digital promotion upon a match of the given second retailer-supplied promotion to any first retailer-supplied promotion. This may occur, for example, when the retailer 24 uploads a retailer-supplied promotion for a given brand item to the database 22 after the retailer has done the same for another geographical and overlapping area. The processor 31 may determine whether a second retailer-supplied digital promotion was previously sent to the user at the remote device 40, for example, by tracking whether it was in fact displayed on the display 41 (for example, within a viewable area and/or determined by a mouse pointer over, and not simply being sent by the processor). In the case, for example, where the user has already "clipped" a second retailer-supplied digital promotion, for example, as determined by user input from the remote device 40, the processor 31 may remove the second retailer-supplied digital promotion from the digital wallet of the user associated with the remote device 40, for example.

Figure 4:
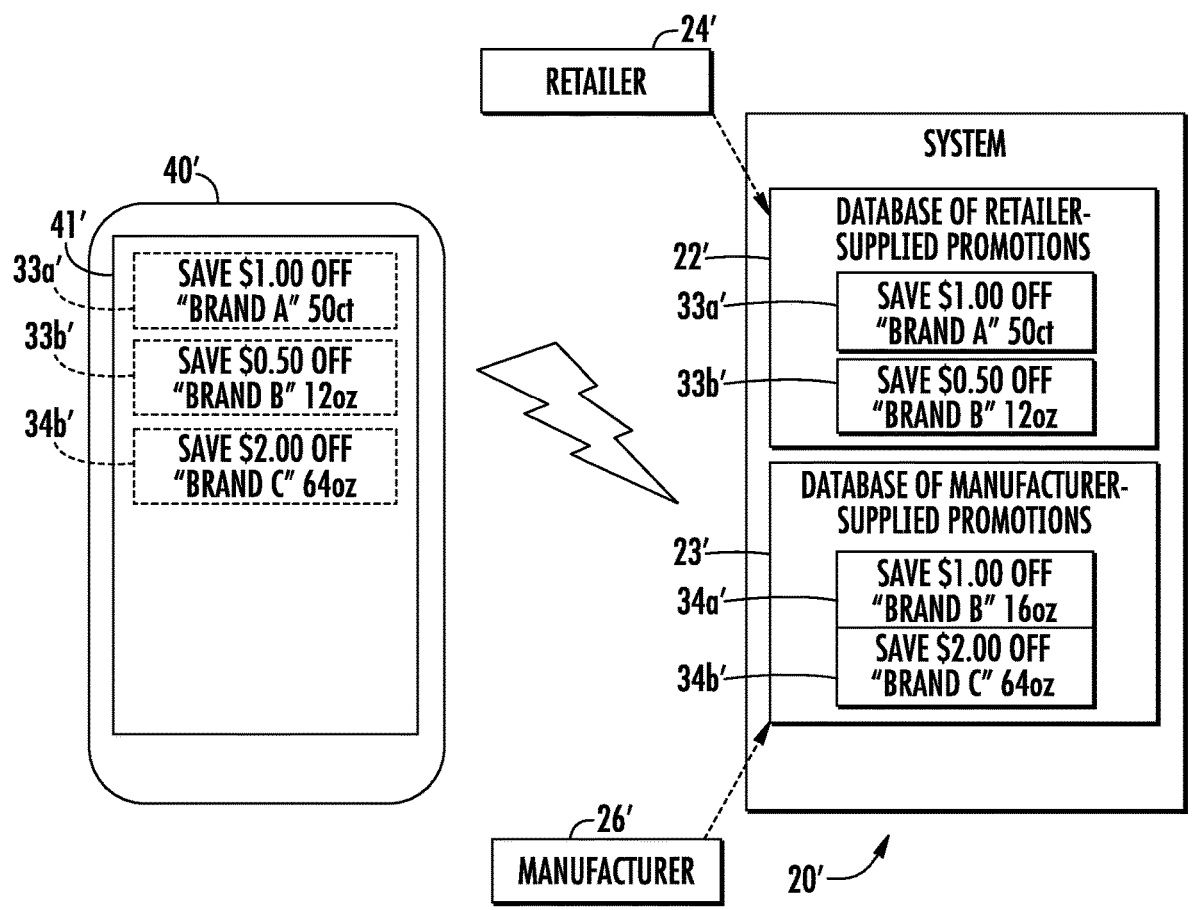
FIG. 4 is a schematic diagram of a system according to another embodiment.
Figure 5:
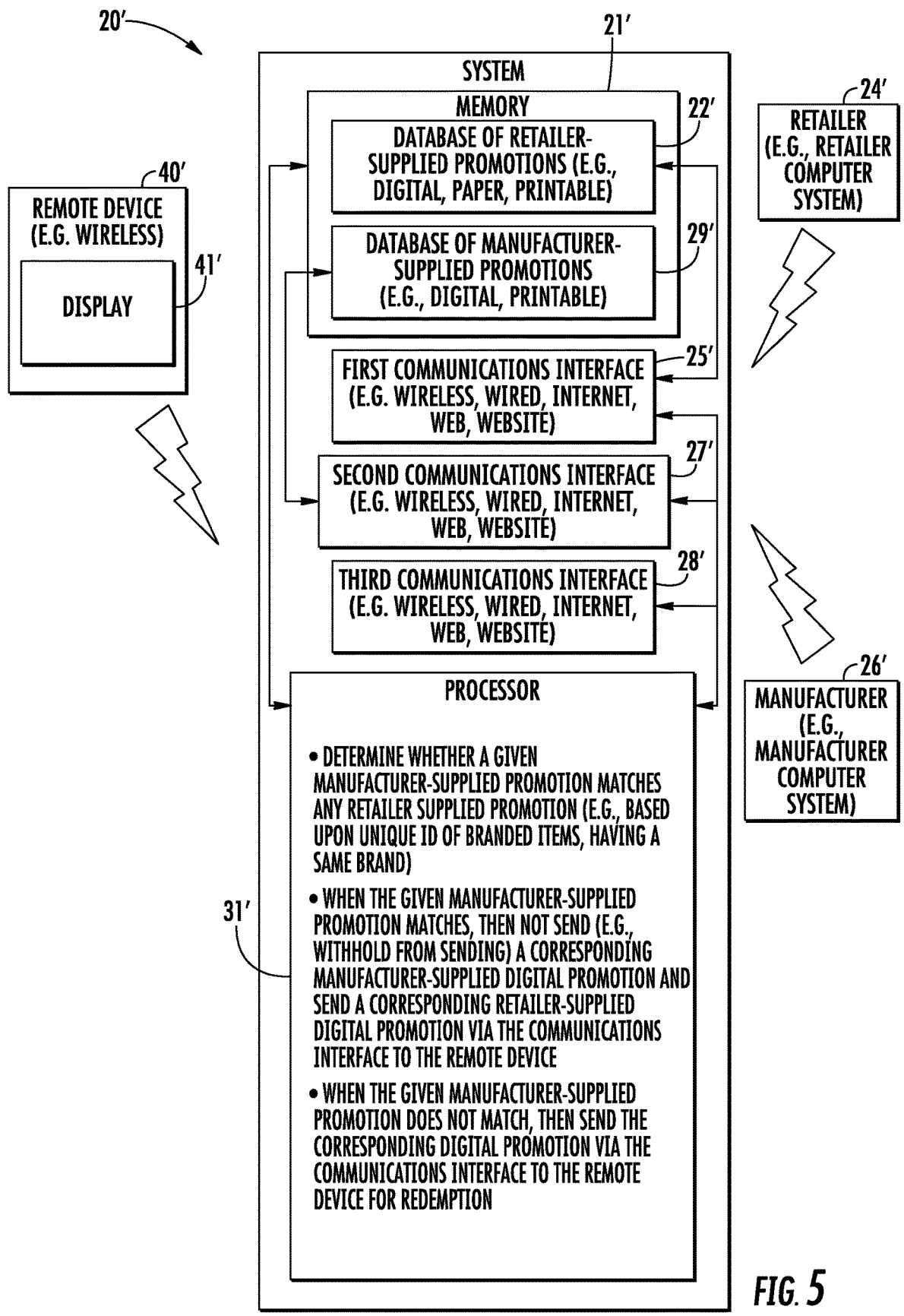
FIG. 5 is more detailed schematic block diagram of the system of FIG. 4.

Referring now to FIGS. 4 and 5, the database of promotions associated with the corresponding brand items may be a database of manufacturer-supplied promotions 23'. In other words, instead of a database of second retailer-supplied promotions, the system 20' includes a database of manufacturer-supplied promotions 23'. Accordingly, a given manufacturer 26' may communicate with the system 20' via the second communications interface 27', for example, an Internet or web interface or portal, to add, delete, or modify the database of manufacturer-supplied promotions 23'. The manufacturer, for example, via a manufacturer computer system that includes a processor coupled to a memory, display, and an input device, may communicate with the system 20' wirelessly or by wire via an application or program or by a web portal accessed by the manufacturer through a web browser, for example. The database of manufacturer-supplied promotions 23' may include manufacturer-supplied promotions for multiple manufacturers, or alternatively, there may different databases of manufacturer-supplied promotions corresponding to each manufacturer. Of course, in some embodiments, the given retailer 24' and given manufacturer 26' may communicate the retailer-supplied and manufacturer-supplied promotions with the system 20' using any number of communications interfaces including a single (e.g., combined) communications interface. More than one manufacturer may have manufacturer-supplied promotions stored in the database of manufacturer-supplied promotions 23' and/or there may be more than one database of manufacturer-supplied promotions each corresponding to a given manufacturer.

When the given promotion, i.e., the manufacturer-supplied promotion, matches, then the processor 31' does not send the corresponding manufacturer-supplied digital promotion 34a' via the third communications interface 28' to the remote device 40'. In other words, the processor 31' withholds the corresponding manufacturer-supplied digital promotion 34a', which would otherwise have been, but for the match, sent to the remote device 40' for redemption. The processor 31', upon the match, may send a corresponding retailer-supplied digital promotion 33b' (i.e. the retailer-supplied digital promotion) to the remote device 40'. It should be noted that while the system 20', is described as being remote from a manufacturer computer system and/or a retailer computer system, in some embodiments, the system may be included as part of or co-located with either a manufacturer computer system or a retailer computer system.

A non-transitory computer-readable medium aspect is directed to a non-transitory computer readable medium that includes computer-executable instructions that when executed by a processor 31 cause the processor to perform operations. The operations may include determining whether a given promotion stored in a database of promotions 23 associated with a first plurality of brand items matches any retailer-supplied promotion stored in a database of retailer-supplied promotions 22 associated with a second plurality of brand items. The operations may also include, when the given promotion matches, then not sending a corresponding digital promotion via a communications interface 28 to a remote device 40, and, when the given promotion does not match, then sending the corresponding digital promotion via the communications interface to the remote device for redemption.

While three communications interfaces have been described, it should be noted that less than three communications interfaces may be used. For example, the retailer 24, manufacturer 26', and remote device 40 may communicate via a single communications interface. Any of the retailer 24, manufacturer 26', and/or remote device 40 may communicate over more than one communications interface.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
    a memory comprising a first database storing retailer-supplied promotions associated with a first plurality of brand items, and a second database storing promotions associated with a second plurality of brand items;
    a remote device comprising a display and a digital wallet;
    a communications interface configured to communicate with the remote device; and
    a processor coupled to said memory and said communication interface and configured to:
    determine a plurality of digital promotions for communication to said remote device via said communications interface and for display on said remote device, the digital promotions corresponding to ones of the promotions associated with the second plurality of brand items;
    wherein the remote device is configured to:
        monitor a viewable area of the display by tracking a cursor on the display for placement over at least one digital promotion of the plurality of digital promotions and communicate a first indication to the processor that the at least one digital promotion has been displayed; and
        receive user input indicative that the at least one digital promotion has been clipped to the digital wallet, and communicate a second indication to said processor that the at least one digital promotion has been clipped to the digital wallet;
    wherein the processor is further configured to:
        determine whether a given digital promotion of the plurality of digital promotions matches any retailer-supplied promotion stored in the first database,
        when the given digital promotion does not match, then communicate the given digital promotion via said communications interface to said remote device for display thereon and redemption;
        subsequent to communicating the given digital promotion to the remote device: store a new retailer-supplied promotion in the first database and determine whether the given digital promotion matches the new retailer-supplied promotion; when it matches, determine whether the processor received the first indication; and if the processor received the first indication, then determine whether the processor received the second indication, and if the processor received the first and second indications, then remove the given digital promotion from the digital wallet;
        when the given digital promotion matches and the given digital promotion has not been sent to the remote device, then (1) withhold communication of the given digital promotion via said communications interface to the remote device so that the given digital promotion, which would have otherwise been displayed on the remote device, is not displayed on the remote device, and (2) send to the remote device a retailer-supplied digital promotion corresponding to the matched retailer-supplied promotion.

2. The system of claim 1 wherein the second database of promotions comprises a second database of retailer-supplied promotions, and wherein the given digital promotion corresponds to another retailer-supplied promotion.

3. The system of claim 1 wherein the second database of promotions comprises a database of manufacturer-supplied promotions, and wherein the given digital promotion corresponds to a manufacturer-supplied promotion.

4. The system of claim 1 wherein said processor is configured to determine whether the given digital promotion matches any retailer-supplied promotion based upon a match of brand names associated with the first and second plurality of brand items.

5. The system of claim 1 wherein the first and second plurality of brand items each have first and second unique identifications (IDs) associated therewith; and wherein said processor is configured to determine whether the given digital promotion matches any retailer-supplied promotion based upon the first and second unique IDs.

6. The system of claim 1 wherein said communication interface comprises a wireless interface.

7. The system of claim 6 wherein the remote device comprises a remote wireless communications device; and wherein said processor is configured to communicate the corresponding digital promotion to said remote wireless communications device via said wireless interface.

8. The system of claim 1 wherein said communication interface comprises a website; and wherein the remote device displays the corresponding manufacturer-supplied digital promotion based upon the website.

9. The system of claim 1 further comprising a further communications interface; and wherein said processor is configured to receive the promotions via said further communications interface.

10. The system of claim 1 wherein the second database of promotions comprises a database of promotions corresponding to paper promotions.

11. The system of claim 1 wherein said processor is configured to determine whether the given digital promotion matches any promotion irrespective of a dollar amount associated with the promotion and the given promotion.

12. A system comprising:
a memory comprising a first database storing first retailer-supplied promotions associated with a first plurality of brand items, and a second database storing second retailer-supplied promotions associated with a second plurality of brand items;
a remote device comprising a display and a digital wallet;
a communications interface configured to communicate with the remote device; and
a processor coupled to said memory and said communication interface and configured to
determine a plurality of second retailer-supplied digital promotions for communication to said remote device via said communications interface and for display on said remote device, the digital promotions corresponding to ones of the second retailer-supplied promotions;
wherein the remote device is configured to
monitor a viewable area of the display by tracking a cursor on the display for placement over at least one digital promotion of the plurality of second retailer-supplied digital promotions and communicate a first indication to the processor that the at least one digital promotion has been displayed; and
receive user input indicative that the at least one digital promotion has been clipped to the digital wallet, and communicate a second indication to the processor that the at least one digital promotion has been clipped to the digital wallet;
wherein the processor is further configured to:
determine whether a given second retailer-supplied digital promotion of the plurality of second retailer-supplied digital promotions matches any first retailer-supplied promotion stored in the first database based upon a match of brand names associated with the first and second plurality of brand items,
when the given second retailer-supplied digital promotion does not match, then communicate the given second retailer-supplied digital promotion via said communications interface to the remote device for display thereon and redemption;
subsequent to communicating the given second retailer-supplied digital promotion to the remote device: store a new first retailer-supplied promotion in the first database and determine whether the given second retailer-supplied digital promotion matches the new first retailer-supplied promotion; when it matches, determine whether the processor received the first indication; and if the processor received the first indication, then determine whether the processor received the second indication; if the processor received the first and second indications, then remove the given digital promotion from the digital wallet,
when the given second retailer-supplied digital promotion matches and the given second retailer-supplied digital promotion has not been sent to the remote device, then (1) withhold communication of the corresponding second retailer-supplied digital promotion via said communications interface to the remote device so that the digital promotion, which would have otherwise been displayed on the remote device, is not displayed on the remote device, and (2) send to the remote device a retailer-supplied digital promotion corresponding to the matched retailer-supplied promotion.

13. The system of claim 12 wherein said communication interface comprises a wireless interface.

14. The system of claim 13 wherein the remote device comprises a remote wireless communications device; and wherein said processor is configured to communicate the corresponding second retailer-supplied digital promotion to said remote wireless communications device via said wireless interface.

15. The system of claim 12 wherein said communication interface comprises a website; and wherein the remote device displays the corresponding second retailer-supplied digital promotion based upon the website.

* * * * *